United States Patent [19]

Hoang et al.

[11] Patent Number: 5,787,084
[45] Date of Patent: Jul. 28, 1998

[54] MULTICAST DATA COMMUNICATIONS SWITCHING SYSTEM AND ASSOCIATED METHOD

[75] Inventors: Hieu M. Hoang, Flower Mound; Brian W. Johnson, Lucas, both of Tex.

[73] Assignee: Compaq Computer Corporation, Houston, Tex.

[21] Appl. No.: 658,742

[22] Filed: Jun. 5, 1996

[51] Int. Cl.$^6$ .............................. H04L 12/28; H04L 12/56
[52] U.S. Cl. .................................................................. 370/390
[58] Field of Search ........................... 370/412, 413, 370/414, 389, 390, 415, 416, 428, 429, 432, 229, 230, 235, 236, 252; 395/877; 364/239.6, 238.2

[56] References Cited

U.S. PATENT DOCUMENTS

| | | |
|---|---|---|
| 5,179,556 | 1/1993 | Turner . |
| 5,301,055 | 4/1994 | Bagchi et al. ............... 359/139 |
| 5,367,523 | 11/1994 | Chang et al. . |
| 5,402,416 | 3/1995 | Cieslak et al. . |
| 5,473,604 | 12/1995 | Lorenz et al. . |
| 5,491,801 | 2/1996 | Jain et al. .................. 395/200.13 |
| 5,493,566 | 2/1996 | Ljungberg et al. ............... 370/413 |
| 5,535,197 | 7/1996 | Cohon ........................... 370/414 |
| 5,577,035 | 11/1996 | Hayter et al. ................. 370/395 |

OTHER PUBLICATIONS

"Telecommunications Protocol and Design" by Spragias et al pp. 980–985, 1991.

*Primary Examiner*—Ajit Patel
*Attorney, Agent, or Firm*—Jenkens & Gilchrist, P.C.

[57] ABSTRACT

An apparatus and associated method for facilitating data flow through a multiple port multicast data switch includes receiving a data packet at a first port of the multicast data switch, the data packet formed of sequentially positioned cells of data. Determining if the second port is congested and if congested sending the selected cell to the second port if and when the second port becomes uncongested within a selected period of time. If otherwise uncongested, copying the cell data to the second port.

11 Claims, 4 Drawing Sheets

MULTICAST DATA COMMUNICATIONS SWITCHING SYSTEM AND ASSOCIATED METHOD

FIELD OF THE INVENTION

The present invention relates to multicast data communication through a switching system. More specifically, the present invention relates to an apparatus and method for facilitating data flow through a multiple port switch for multicast and broadcast data communication.

BACKGROUND OF THE INVENTION

In data communications, data is often exchanged between devices in the form of a packet. Typically, a packet is a collection of information that contains data information (the "payload") and headers. Headers generally include the source and destination address as well as control information to handle errors and keep packets flowing properly. Each packet is a separate block of information that can have either the same or a different destination address and in some cases, can be different sizes.

As a packet is sent out to a receiver, the addressing information contained therein is used by devices such as switches, bridges and routers, to direct the packet to its destination or receiver.

In packet data communications, there are basically two different types of communication, unicast and multicast.

In unicast data communication, there is one sender and one receiver. The sender sends the packet to the single known receiver. This is very similar to a point to point connection.

In multicast data communication, there is one sender and multiple receivers. The sender sends the packet to at least some of the multiple receivers. A broadcast type of multicast data communication is when the one sender sends a packet to all of the receivers.

A multiport switching system is one mechanism used to establish communication channels among two or more interfaces at a sender's demand in data communication systems. In the general operation of such switching systems, packets from the sender are received at a switching port (an "incoming port") and transferred to other switching ports ("outgoing ports") all within the same switch. The outgoing ports are ultimately connected to the intended receivers.

In many current switching systems used in multicast data communication schemes, when a data packet is received at an incoming port, a copy of the data packet is made for each addressed outgoing port and then sent sequentially to these outgoing ports. For example, for a 6 port switch, one incoming port and 5 outgoing ports, a data packet received at the incoming port and destined for the 5 outgoing ports would be copied and sent to a first outgoing buffer associated with the first outgoing port. The packet is then sent out the first outgoing port to the first receiver. The data packet is then copied a second time and sent to a second outgoing buffer associated with the second outgoing port. The packet is then sent out the second outgoing port to the second receiver. This continues for each outgoing port that is addressed for reception of the data packet.

However, the data communication time for such an operation becomes a problem as the number of receivers increases. When the number of receivers increases, the number of times the packet is copied and sent to the corresponding outgoing ports also increases, thereby increasing the total time between when the packet is first received at the incoming port and when the packet is sent out the final outgoing port.

Another problem that arises with the traditional multicast scheme described above occurs when one or more of the addressed outgoing ports are congested and are unable to receive the data packet. When this occurs many systems will lock up waiting for the congested outgoing ports to become available. Other systems will just drop the packet being sent.

SUMMARY OF THE INVENTION

The present invention overcomes the above identified problems as well as other shortcomings and deficiencies of existing technologies by providing a multicast data communication switch and an associated method for facilitating data flow therein.

The present invention further provides a multiport data communication switch and an associated method wherein a data packet is received into a switching port block of the switch. The data cells of the data packet are each copied sequentially onto a data bus at selected times. The data cells are copied from the data bus into the destination switching port blocks of the switch. The received data cells are reassembled back into the data packet and transmitted from each of the destination switching port blocks to a corresponding receiver.

If any of the destination switching port blocks are temporarily congested and unavailable to receive a data cell, and if any of the congested switching port blocks become uncongested within a select period of time, the data cell is re-sent as soon as possible to the now uncongested port(s). This occurs before any subsequent data cells are copied onto the data bus. If the selected period of time times out, any of the receiving switch port blocks that are still congested are dropped from receiving any more data cells of that data packet.

BRIEF DESCRIPTION OF THE DRAWINGS

A more complete understanding of the method and apparatus of the present invention may be had by reference to the following Detailed Description and appended claims when taken in conjunction with the accompanying Drawings wherein:

DETAILED DESCRIPTION

Figure 1:
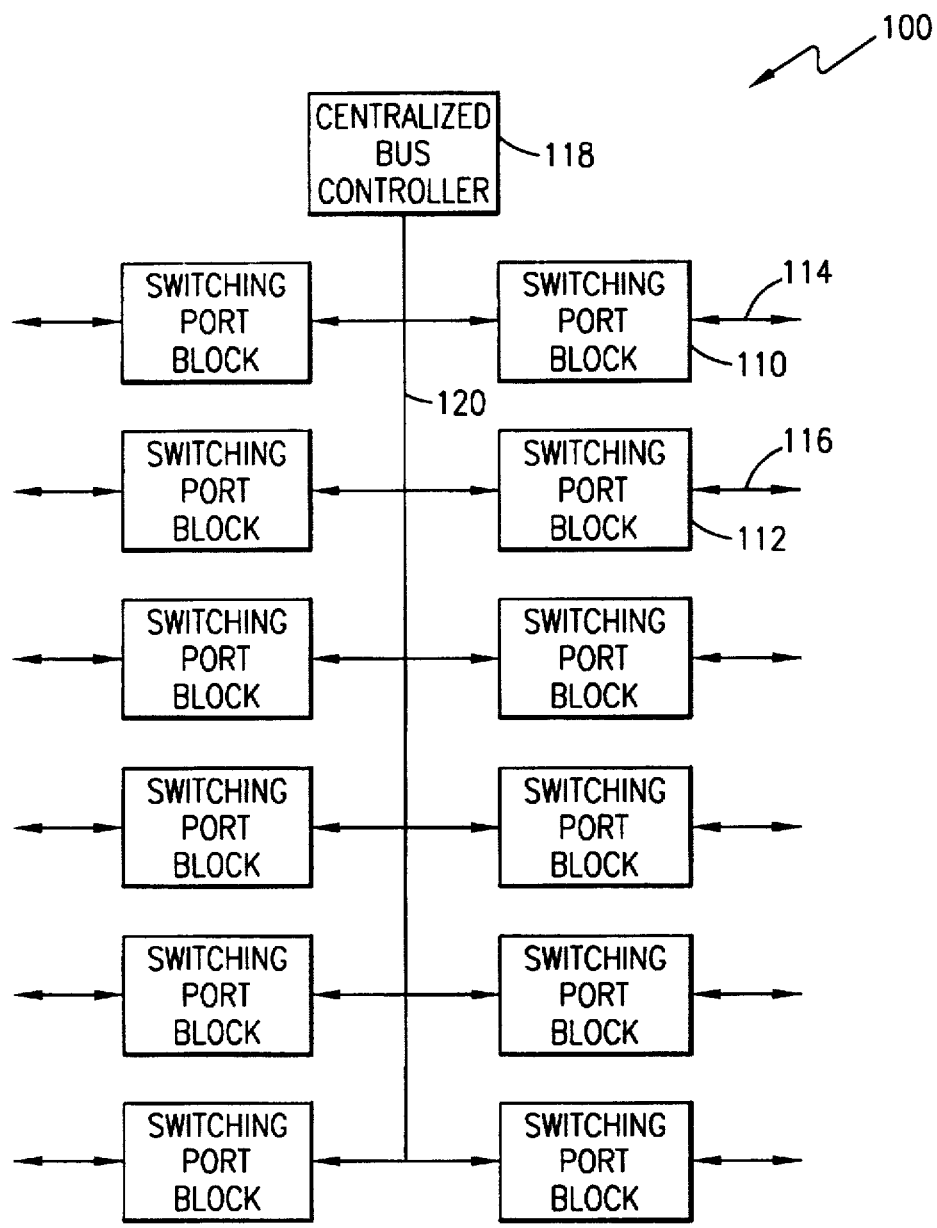
FIG. 1 is block diagram illustrating a data communication switch relating to the present invention.

Referring now to FIG. 1, there is shown a block diagram of a data communication switch 100 for use in a multicast data communication system, such as a 100 Mbit Ethernet system. Switch 100 includes twelve switching port blocks such as switching port blocks 110 and 112. Each of the twelve switching port blocks includes an I/O port, such as ports 114 and 116 for receiving and transmitting data to and from switch 100. Switch 100 further includes a centralized bus controller 118, and a cell bus 120.

Each of the switching port blocks of switch 100 communicate with each other via cell bus 120. All of the switching port blocks interface with cell bus 120 via a pair of FIFOs (a receive FIFO and a transmit FIFO) located in each of the switching port blocks (see FIG. 2). A centralized bus controller 118 preforms the bus arbitration for each of the switching port blocks. Good results have been achieved using a 32 bit wide bus for cell bus 120, however it is contemplated to be within the scope of this invention that other configurations for cell bus 120 could also be implemented.

Although switch 100 is shown with twelve switching port blocks, it is contemplated to be within the scope of the invention that any number of switching port blocks could be utilized.

In the general multicast operation of switch 100, data is received at a switching port block (input port block) in the form of a data packet where it is fragmented into "cells". Complete cells are transferred uninterrupted across cell bus 120 to the other designated switching port blocks (output port blocks). The data packets are reassembled at each of the output port blocks from the cells received therein. The packets are then sent from each of the output port blocks to the corresponding next receiver.

If congestion occurs at one or more of the output port blocks such that the congested block(s) cannot receive a data cell from the input port block, the data cell may be resent from the input port block to the congested output port block(s) under certain circumstances, which are discussed in more detail below.

Although switch 100 of the present invention is described for use in a 100 Mbit Ethernet system, it is contemplated that other types of network data communication systems could be used, such as a fiber distributed data interface (FDDI) system.

Figure 2:
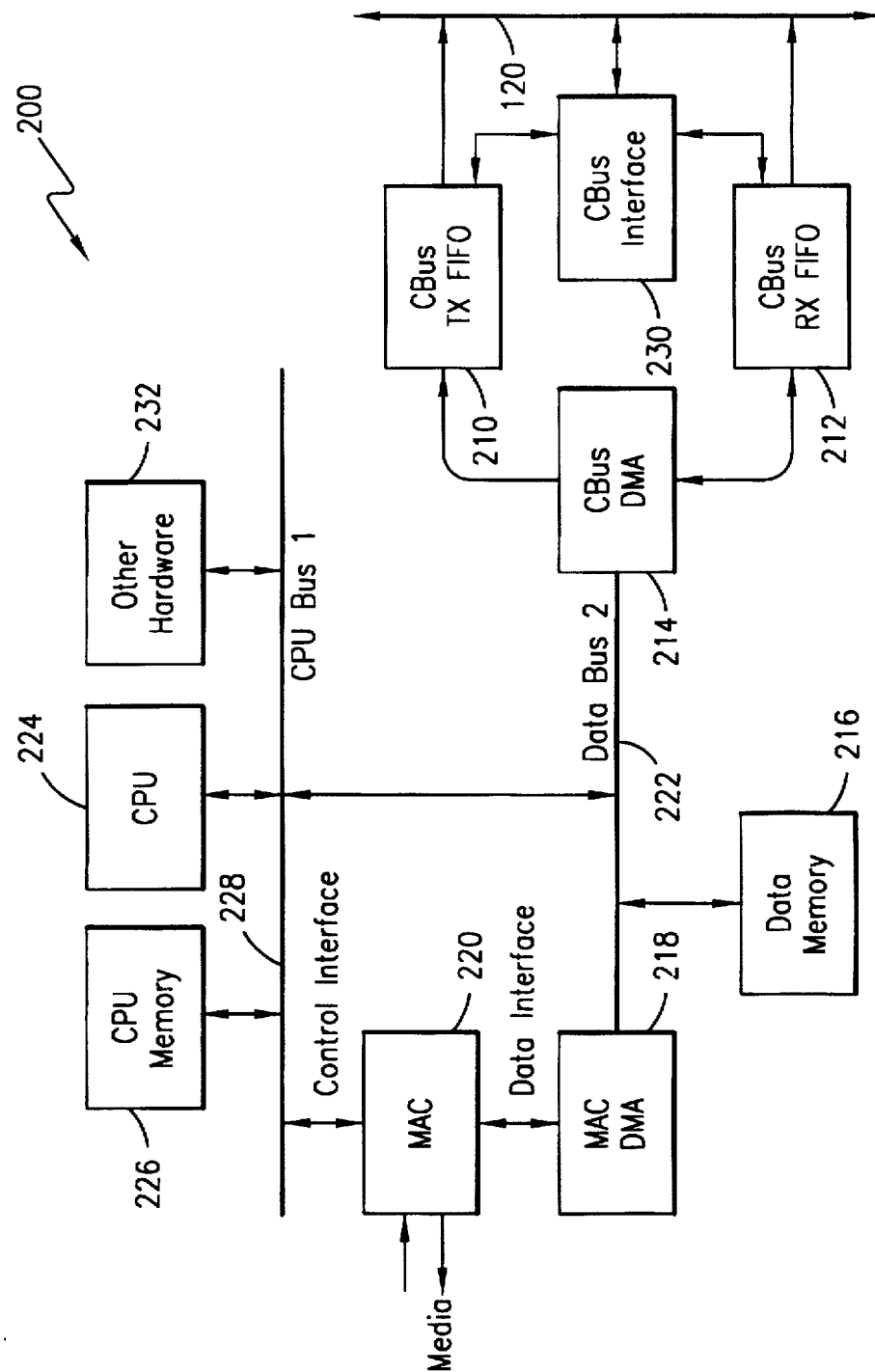
FIG. 2 is a block diagram illustrating in more detail a switching port block as similarly shown in FIG. 1.

Referring now to FIG. 2, there is shown a block diagram depicting in more detail the physical architecture of an individual switching port block 200 of the present invention. Switching port block 200 includes a cell bus transmit FIFO 210 and a cell bus receive FIFO 212, each of which are connected to cell bus DMA 214. Both cell bus transmit FIFO 210 and cell bus receive FIFO 212 interface with cell bus 120. A cell bus interface 230 is connected to cell bus transmit FIFO 210 and cell bus receive FIFO 212, and performs the transfer of data between FIFOs 210, 212 and cell bus 120. Switching port block 200 further includes data memory 216, a media access control (MAC) DMA 218 and a MAC 220. MAC DMA 218 moves data between memory 216 and MAC 220. Cell bus DMA 214 moves data between data memory 216 and Cbus FIFOs 210 and 212.

Switching port block 200 further includes a CPU 224, a CPU memory 226 and other firmware and hardware 232. CPU 224 communicates to CPU memory 226 through an internal data bus 228.

Internal data bus 228 is utilized by CPU 224 to execute firmware, while internal data bus 222 is used by MAC DMA 218 and cell bus DMA 214 for moving the cells between MAC 220 and cell bus 120.

Continuing with FIG. 2, data memory 216 may preferably be implemented into two blocks of memory, each of which is used for implementing a data structure known as a ring which may be understood as a circular buffer that could be pointed to by two or several pointers.

Figure 3:
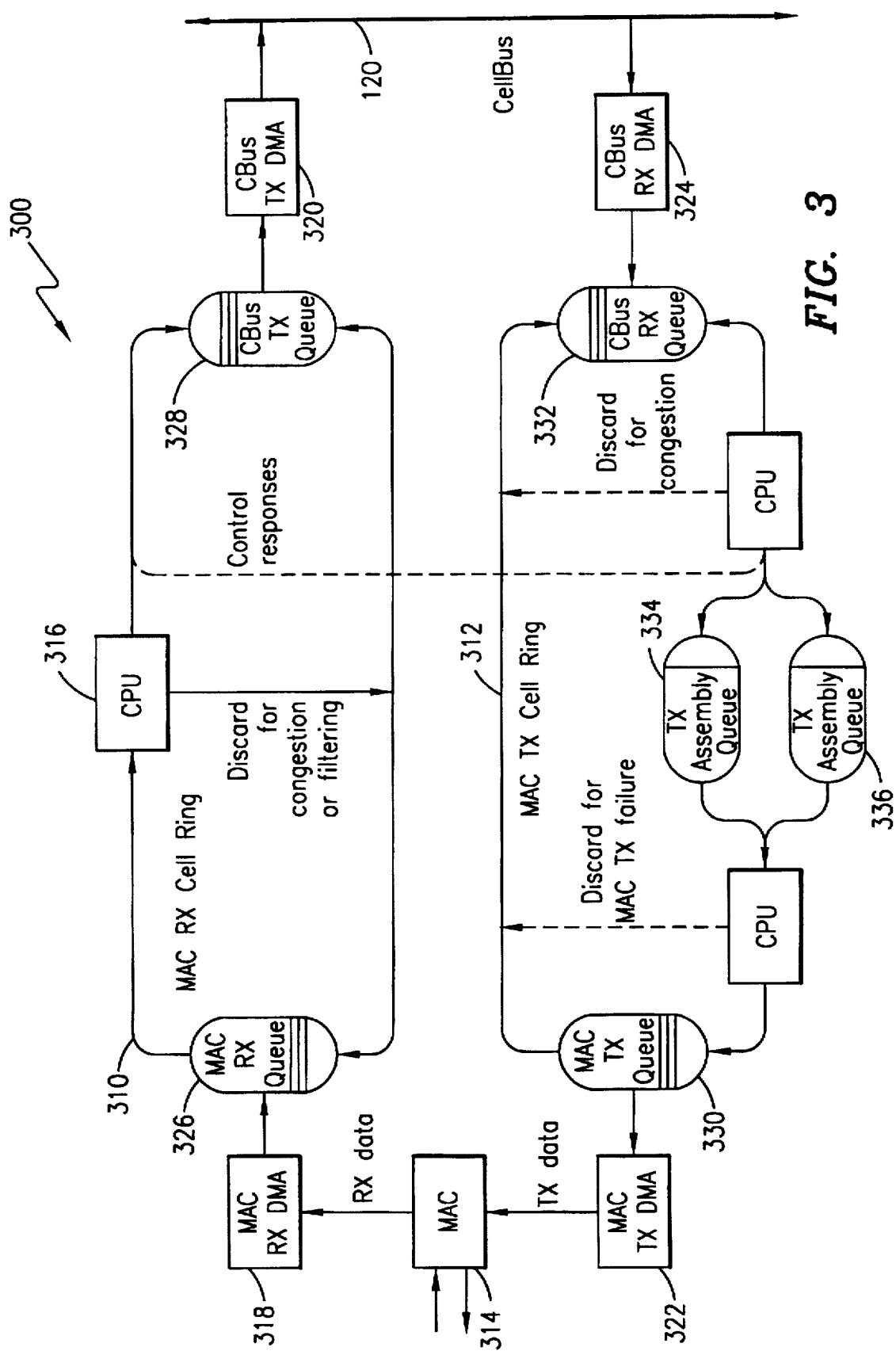
FIG. 3 is a block diagram illustrating the cell and data flow within a switch block as similarly shown in FIG. 2.

Referring now to FIG. 3, block diagram 300 depicts the logical cell data flow within an individual switching block port. Two logical rings are utilized and maintained: a MAC receive cell ring 310 (MAC RX cell ring); and a MAC transmit cell ring 312 (MAC TX cell ring). MAC RX cell ring 310 is for data cells received from MAC 314 or created by CPU 316 and forwarded to other switching port blocks. MAC TX cell ring 312 is for data cells received from the other switching port blocks, intended for CPU 316 or for transmission through MAC 314.

Although CPU 224 and data memory 216 (see FIG. 2) are shown as single structural entities, CPU 224 is functionally and logically subdivided into the three CPU's shown in FIG. 3, and data memory 216 is functionally and logically subdivided into MAC RX Queue 326, Cbus TX Queue 328, MAC TX Queue 330, Cbus RX Queue 322, and TX Assembly Queues 334 and 336.

In both MAC RX cell ring 310 and MAC TX cell ring 312 the data cells are maintained as a permanent ordered ring. In MAC RX cell ring 310, data cells are always processed in precise sequential ring order. This means that data cells are filled by the MAC RX DMA 318, processed by firmware of CPU memory 226 (see FIG. 2), and transmitted by the cell bus TX DMA 320, in ring order. Data cells that are filtered, so that transmission is unnecessary, still pass through cell bus TX DMA 320, but are not forwarded to any other switching port blocks.

In the MAC TX cell ring 312, data cells are similarly processed in sequential ring order, except that cells must be reassembled into packets for transmission. This means that the MAC TX DMA 322 may process cells out of ring order.

By processing the data cells in ring order, no data cell is allowed to be placed in a waiting queue for an arbitrary period of time. All cells in both the MAC RX cell ring 310 and the MAC TX cell ring 312 must be processed in a timely manner. This means that high priority request data cells cannot be queued for significantly later processing.

The operation of the present invention with reference to FIGS. 1, 2 and 3 will now be described. A packet of data to be multicast or broadcast is received by a switching port block at MAC 314. The data packet is fragmented into data cells and copied into cell buffers in data memory 216 by MAC RX DMA 318. If the data cell is determined to be transmissible the data cell is then copied into cell bus TX FIFO 210 by cell bus DMA 214. When a complete data cell has been transferred to the FIFO, cell bus interface 230 asserts a cell bus arbitration request. When arbitration is granted, cell bus interface 230 transfers the data cell from the cell bus TX FIFO 210 to all of the addressed cell bus RX FIFOs of the destination switching port block. This is done in accordance with a destination bitmap contained within each data cell. Once a data cell has been transmitted to the cell bus RX FIFOs of the destination switching port blocks, the operation of sending data cells continues as described above.

If one or more of the destination switching port blocks are temporarily congested, i.e. they are not available to receive the data cell, the transmission of that data cell to the congested block(s) is deferred until transmission to some or all of the congested destinations can be successfully completed, or until a predetermined amount of time has passed, indicating that the data cell has timed-out. If the data cell times-out, that data cell is dropped and none of the subsequent data cells of the same data packet are sent to the congested destination(s).

If one or more of the destination switching port blocks are determined to be permanently congested, then the data cell is not sent to the permanently congested switching port blocks, that data cell is dropped and none of the subsequent data cells of the data packet are sent to the permanently congested switching port block(s).

At the destination switching port block, as a data cell is received, it is copied into the cell bus RX FIFO 212. As the data cell is being copied into the cell bus RX FIFO 212, the data cell can be copied from the FIFO into a cell buffer of data memory 216 by the cell bus RX DMA 324. The data cells are reassembled into the proper data packet form by the CPU 224 in assembly queues 334 and 336. When the data packet is completely reassembled, it is copied into MAC 314 by MAC TX DMA 322 and transmitted out of the switching port block.

Figure 4:
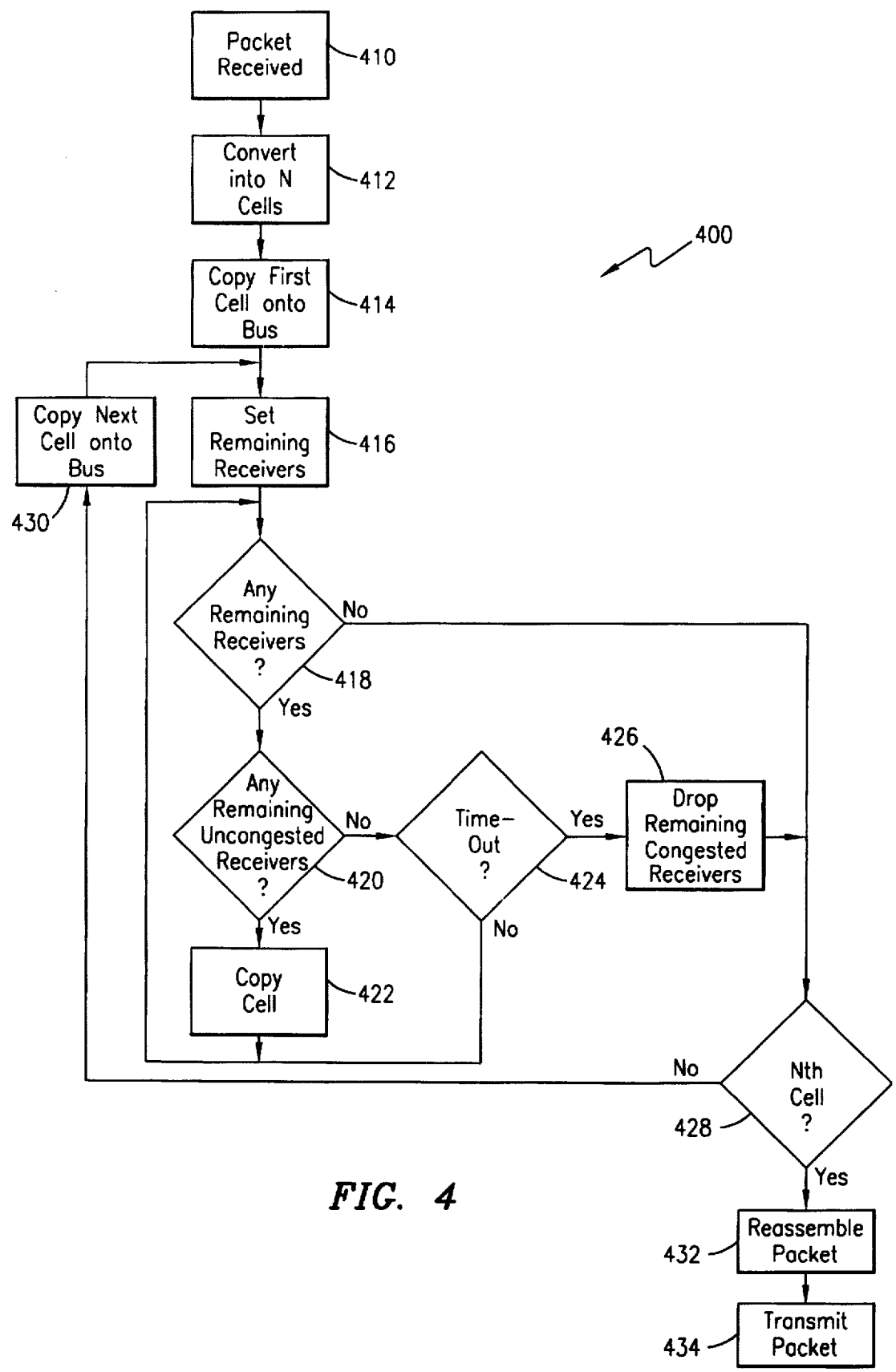
FIG. 4 is a flow diagram illustrating the method steps of the method of operation of an embodiment of the present invention.

Referring now to FIG. 4, there is shown a flow diagram 400 depicting a method of an embodiment of the present invention for facilitating multicast and broadcast data flow in a switch as similarly shown in FIG. 1. First, as indicated by block 410, a data packet is received at one of the switching port blocks of the switch. Then, as indicated by block 412, the packet is converted into data cells. Thereafter, as indicated by block 414, the first data cell is copied onto the data bus for each of the receiving switching port blocks to receive.

Then, as indicated by block 416, the remaining receivers are set, i.e. the destination bit map of the cell is modified to corresponded to the remaining receivers. Thereafter, as indicated by decision block 418, a determination is made as to whether there are any remaining receivers to receive the data cell.

If a determination is made that there is at least on receiver remaining to receive the data cell, the yes branch is taken to decision block 420. As indicated by decision block 420, a determination is made as to whether an of the remaining receivers are uncongested. If a determination is made that any of the remaining receivers are uncongested, the yes branch is followed to block 422 where the data cell is then sent to the uncongested receivers. Subsequent thereto, the process loops back to decision block 418. If the determination of decision block 420 is in the negative, the no branch is followed to decision block 424. At decision block 424 a determination is made as to whether the data cell has timed-out. If a selected amount of time has not yet passed, then the no branch is taken and the process loops back to decision block 418. If a selected amount of time has passed, the yes branch is followed to block 426 where the remaining congested receiving switching port blocks are dropped from receiving that data cells and any subsequent data cells from this data packet. Then the process proceeds to decision block 428 (described in more detail below).

Referring back to decision block 418, if a determination is made that there are no remaining receivers for the selected data cell, then the no branch is taken to decision block 428. A determination is made at block 428 as to whether all of the data cells for the data packet have been transmitted to the outgoing switching port blocks. If the determination is negative, the no branch is taken to block 430, where the next data cell copied onto the bus allowing the above described process starting with block 416 to be repeated for the next data cell.

If the determination is made that the last data cell has been transmitted indicating that all of the data cells of the data packet have been transmitted, the yes branch is taken to block 432, where each of the outgoing switching port blocks reassemble the data packet from the received data cells. Then, as depicted by block 434, the packets are transmitted by the corresponding outgoing switching port blocks.

An essential difference of the method described above in relation to known communication methods, is that each data is copied only once onto the cell bus for all of the receiving switching port blocks in the absence of congestion, rather than copying it sequentially for each of the switching port blocks.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for facilitating data flow through a multicast data switch having at least a first port and a second port, said method comprising the steps of:

receiving a data packet at the first port of the multicast data switch, the data packet formed of a plurality of cells of data;

determining if the second port is congested;

if uncongested, sending a select cell of the data packet to the second port of the multicast data switch;

otherwise, sending the select cell of the data packet to the second port if the second port becomes uncongested within a select period of time; and reassembling the data packet at the second port subsequent to copying each of the plurality of cells into the second port.

2. The method as recited in claim 1, wherein if the second port is congested:

determining if the congestion will exceed a selected amount of time; and if so, setting said select period of time equal to zero.

3. The method as recited in claim 1, wherein if said select period of time expires before the second port becomes uncongested:

dropping the select cell; and preventing any subsequent data cells of the data packet from being sent to the second port.

4. A method for facilitating data flow through a multiple port multicast data switch, said method comprising the steps of:

receiving a data packet at a first port of the multicast data switch, the data packet formed of a plurality of cells, wherein for each of the cells of data, determining if any of the plurality of receiving ports are congested;

if all of the receiving ports are uncongested, sending a selected cell of data to each of the receiving ports;

otherwise, sending the selected cell to the uncongested receiving ports and sending the selected cell of data to any of the congested receiving ports that become uncongested within a select period of time, wherein if any of the plurality of receiving ports are congested:

determining if the congestion of any of the receiving ports will exceed a selected amount of time; and if so preventing any such congested receiving port from receiving any subsequent cells of data.

5. The method as recited in claim 4, wherein if said select period of time expires before any of the congested receiving ports become uncongested:

dropping the cell of data; and preventing any subsequent cells of data of the data packet from being sent to the congested receiving ports.

6. The method as recited in claim 4, wherein if any of the congested receiving ports become uncongested before said select period of time expires:

sending said selected cell of data to any of the now uncongested ports when they become uncongested.

7. The method as recited in claim 4, wherein if any of the plurality of receiving ports are congested:

determining if the congestion of any of the receiving ports will exceed a selected amount of time; and if so preventing any such congested receiving port from receiving any subsequent cells of data.

8. A switching system for facilitating data flow through a multiple port multicast data switch, said switching system comprising:

a first switching port block for receiving a data packet, said data packet formed of a plurality of sequentially positioned cells of data;

a second switching port block;

means for determining if said second switching port block is congested;

a direct memory access device for sending each of said plurality of cells of data at selected times in sequential order from said first switching port block to said second switching port block;

said direct memory access device being responsive to said determining means wherein if said determining means determines said second switching port block is congested, said direct memory access device sends said cell of data to said second switching port block if and when said second switching port block becomes uncongested within a selected period of time; and said second switching port block including an interface for copying each of said plurality of cells of data into said second switching port block.

9. The system as recited in claim 8, wherein:

said second switching port block includes an assembler for reassembling said data packet from said cells of data subsequent to each of said plurality of cells of data being copied therein.

10. The system as recited in claim 9, wherein:

said second switching port block includes a media access controller device for transmitting said reassembled data packet from said second switching port block.

11. A method for facilitating data flow through a multiple port multicast data switch, said method comprising the steps of:

receiving a data packet at a first port of the multicast data switch, the data packet formed of a plurality of sequentially positioned cells of data, wherein for each of the sequentially positioned cells of data, determining if any of the plurality of receiving ports are congested; and if all of the receiving ports are uncongested;

sending a selected cell of data to each of the receiving ports; and otherwise if any of the plurality of receiving ports are congested;

sending the selected cell to the uncongested receiving ports;

sending the selected cell of data to any of the congested receiving ports that become uncongested within a select period of time;

reassembling the data packet at the receiving ports subsequent to copying each of the plurality of cells of data into the receiving ports; and transmitting the data packet from the receiving ports subsequent to reassembling the data packet.

* * * * *